(12) United States Patent
Claire et al.

(10) Patent No.: US 9,616,792 B2
(45) Date of Patent: Apr. 11, 2017

(54) ASSIST GRIP HANDLE FOR VEHICLE INTERIOR

(71) Applicant: ILLINOIS TOOL WORKS INC., Glenview, IL (US)

(72) Inventors: Pierre Claire, Senots (FR); Michael Esselin, L'Isle Adam (FR); Gilles Granjon, Mery sur Oise (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/787,274

(22) PCT Filed: Apr. 24, 2014

(86) PCT No.: PCT/US2014/035314
§ 371 (c)(1),
(2) Date: Oct. 27, 2015

(87) PCT Pub. No.: WO2014/179147
PCT Pub. Date: Nov. 6, 2014

(65) Prior Publication Data
US 2016/0075265 A1 Mar. 17, 2016

(30) Foreign Application Priority Data
May 2, 2013 (FR) ...................................... 13 54059

(51) Int. Cl.
*B60N 3/02* (2006.01)
*B60Q 3/02* (2006.01)

(52) U.S. Cl.
CPC ............... *B60N 3/026* (2013.01); *B60N 3/02* (2013.01); *B60Q 3/0233* (2013.01)

(58) Field of Classification Search
CPC ......... B60N 3/02; B60N 3/026; B60Q 3/0233
See application file for complete search history.

(56) References Cited

U.S. PATENT DOCUMENTS

| 4,686,609 A | 8/1987 | Dykstra et al. |
| 5,366,127 A * | 11/1994 | Heinz ...................... B60R 7/10 |
| | | 16/284 |
| 7,104,675 B2 | 9/2006 | Chen |
| 2004/0109324 A1 | 6/2004 | Tiesler et al. |
| 2009/0147528 A1 | 6/2009 | Wang |

FOREIGN PATENT DOCUMENTS

| CN | 202345461 U | 7/2012 |
| CN | 202429117 U | 9/2012 |

OTHER PUBLICATIONS

ISR and WO for PCT/US2014/035314 mailed Aug. 5, 2014.

* cited by examiner

*Primary Examiner* — Stephen F Husar
(74) *Attorney, Agent, or Firm* — Hauptman Ham, LLP (57) ABSTRACT

The invention concerns an assist grip handle for a vehicle interior, comprising a handle body provided with an internal space and a light-emitting device disposed in said internal space of said body, characterized in that said light-emitting device is distinct from said body and comprises a light source and a diffusion screen disposed in said internal space of said body, which body comprises a first part and a second part fastened together and configured to sandwich said light source and said diffusion screen, said diffusion screen being disposed facing both said light source and said first part of said body.

15 Claims, 4 Drawing Sheets

ASSIST GRIP HANDLE FOR VEHICLE INTERIOR

RELATED APPLICATIONS

The present application is a National Phase of International Application No. PCT/US2014/035314 filed Apr. 24, 2014 and claims priority to French Application No. 1354059 filed May 2, 2013.

The invention relates to the field of holding assemblies and in particular assist grip handles for vehicle interiors.

There are known from U.S. Pat. No. 7,104,675 assist grip handles for vehicle interiors comprising a handle body made in one piece from a transparent material configured to allow light to pass through it and a light source formed by a strip of light-emitting diodes. The handle body and the light source form a light-emitting device.

The handle body includes a holding portion extending in a general direction in which the assist grip handle extends and two fixing portions disposed at either end of the holding portion.

The handle body further includes:
an internal space forming a reception chamber for receiving the strip of diodes;
two lateral openings at the ends of the holding portion, leading into the reception chamber and enabling insertion of the strip of diodes into this chamber;
two orifices in the fixing portions for inserting fixing members for fixing the assist grip handle in a unique stable position on metalwork inside a motor vehicle, above side windows of this vehicle;
two caps for closing respective lateral openings;
an access window on one face of the holding portion between the lateral openings and the fixing portions, leading into the reception chamber and providing access to the strip of diodes when it is in this chamber; and
a cover wall for closing the access window.

To assemble the assist grip handle, one of the caps is removed from the handle body and the strip of diodes is inserted into the reception chamber via the respective orifice in this body. It is possible also to remove the cover wall to obtain access to this strip and thus to facilitate its insertion in the chamber. The cap and where applicable the cover wall are then replaced on the handle body.

The invention aims to provide an improved assist grip handle that is particularly simple, convenient and economical.

The invention therefore consists in an assist grip handle for a vehicle interior, comprising a handle body provided with an internal space and a light-emitting device disposed in said internal space of said body, characterized in that said light-emitting device is distinct from said body and comprises a light source and a diffusion screen disposed in said internal space of said body, which body comprises a first part and a second part fastened together and configured to sandwich said light source and said diffusion screen, said diffusion screen being disposed facing both said light source and said first part of said body.

The assist grip handle in accordance with the invention is an assist grip handle with built-in light that is particularly simple, convenient and economical both to manufacture and to assemble.

In fact, the assist grip handle in accordance with the invention provides a simple and convenient way to place the light-emitting device accurately on one of the first and second parts of the handle body and then to fit the other of the second and first parts of this body to sandwich the light source and the diffusion screen.

Furthermore, sandwiching the light-emitting device between the first and second parts of the handle body ensures durable retention of this light-emitting device in position in this body, despite the loads to which the assist grip handle in accordance with the invention may be subjected when it is held by a passenger in the vehicle.

In accordance with a preferred, simple, convenient and economical feature, said diffusion screen comprises a movable shutter and said handle has a first lighting configuration in which said shutter is in a closed position and a second lighting configuration in which said shutter is in an open position.

The assist grip handle in accordance with the invention is an assist grip handle that offers the advantage of providing a new function, namely a built-in light with multiple configurations. In fact, the position of the shutter defines a particular (first or second) lighting configuration of the assist grip handle. In particular, in the closed position of the shutter, this is a so-called ambient or diffuse lighting configuration (first configuration), while in the open position of the shutter this is a more powerful, so-called functional lighting configuration, for example for reading (second configuration).

In accordance with preferred, simple, convenient and economical features of the assist grip handle in accordance with the invention:
said diffusion screen comprises a frame and a cover formed together from at least one plastics material, said shutter being movably mounted on said cover;
said diffusion screen further comprises a groove formed between said cover and said frame and which is configured for translational guiding of said shutter, and a through-aperture formed in said cover and into which enters said groove, said through-aperture and said groove being configured such that, in said closed position of said shutter, said shutter obturates said through-aperture and in said open position of said shutter, said shutter does not obturate said through-aperture;
said first part is provided with a diffusion window formed so as to face said cover of said diffusion screen;
said first part has an inside face provided with at least one first holding member defining a reception space for at least partially receiving said diffusion screen, and said cover comprises a predetermined contour configured to cooperate with said at least one first holding member for holding said diffusion screen;
said first part comprises two first holding members disposed on respective opposite sides of said diffusion window and which are each formed by a first wall projecting from said inside face of said first part, which first wall has a back portion and a lateral portion defining a shoulder;
said second part has an inside face provided with at least one second holding member defining a reception space for receiving said light source at least partially, which light source comprises a support configured to rest on said at least one second holding member for holding said light source;
said second part comprises two second holding members each formed by a second wall projecting from said inside face of said second part, which second wall has a back portion and two lateral portions extending on respective opposite sides of said back portion and each defining a shoulder;

said second part is further provided with two ribs projecting from said inside face of said second part, which ribs are disposed on respective opposite sides of said at least one second holding member and delimit said reception space for receiving said light source;

said diffusion screen comprises four notches each formed so as to receive a finger formed projecting from a said rib;

said diffusion screen comprises a frame and a cover which are formed together in at least one plastics material as well as a plurality of apertures each of predetermined contour formed in said cover and configured to diffuse light;

said light source comprises a support, at least one light emitting element mounted on said support and at least one energy storage unit which is mounted on said support and configured to electrically supply said at least one light emitting element;

said light source comprises a support, at least one light emitting element mounted on said support and an electrical connection element fastened to said support and configured to electrically supply said at least one light emitting element; and/or said handle body comprises a central portion for gripping and two end portions each provided with two arms which are remote from each other, said handle further comprising two fastening plates each configured to be hingedly mounted on said handle body between two said arms of a respective end portion, at least one of the two said plates comprising a through-aperture configured to allow the passage of said electrical connection element.

The description of the invention will now continue with the description of one embodiment given hereinafter by way of nonlimiting illustration with reference to the appended drawings, in which.

Figure 1:
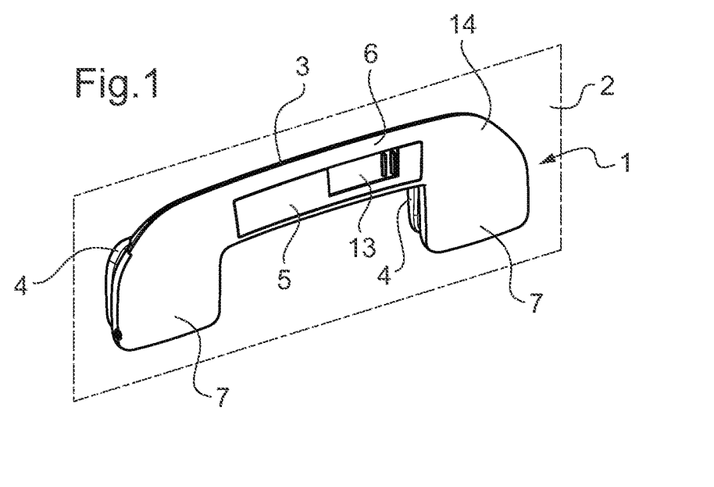
FIGS. 1 and 2 show a hinged assist grip handle in accordance with the invention for a vehicle interior, here mounted on metalwork inside the vehicle, respectively in a retracted position in which the assist grip handle is also in a first lighting configuration and in a deployed position.
Figure 2:
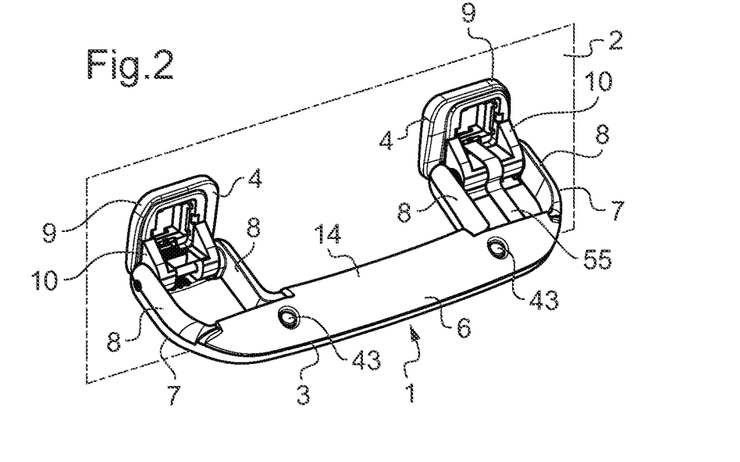

FIGS. 1 and 2 show a hinged assist grip handle 1 with a built-in light and here fixed to metalwork 2 inside a motor vehicle (not shown), for example above a side window of this vehicle.

The assist grip handle 1 comprises a handle body 3 made from a plastics material, two plates 4 for fastening the assist grip handle 1 to the metalwork 2 and a light-emitting device 5 distinct from the handle body 3 providing the light incorporated into the assist grip handle 1.

The assist grip handle 1 extends in a longitudinal general direction and comprises a central portion 6 for gripping and two end portions 7 disposed at either end of the central portion 6 for gripping, each of the end portions 7 being provided with two arms 8 which are remote from each other.

Each fastening plate 4 includes a base 9 configured to be mounted on the metalwork 2 and a head 10 configured to be mounted between two arms 8 of a respective end portion 7 to articulate the handle body 3 to each of the plates 4.

In FIG. 1 the assist grip handle 1 is shown in a retracted position and in a first so-called ambient or diffuse lighting configuration.

In FIG. 2 the assist grip handle 1 is shown in a deployed position in which the handle body 3 and more particularly the central portion 6 for gripping is at a distance from the bases 9 of the fastening plates 4 and consequently at a distance from the metalwork 2.

In the deployed position of the assist grip handle 1 shown in FIG. 2, a passenger in the vehicle can grab an exterior face 14 of the central portion 6 for gripping of the handle body 3 in order to steady themself.

The light-emitting device 5 comprises a light source 11 and a diffusion screen 12 including a shutter 13 movable in translation (see notably FIGS. 1 and 3 to 6).

Figure 3:
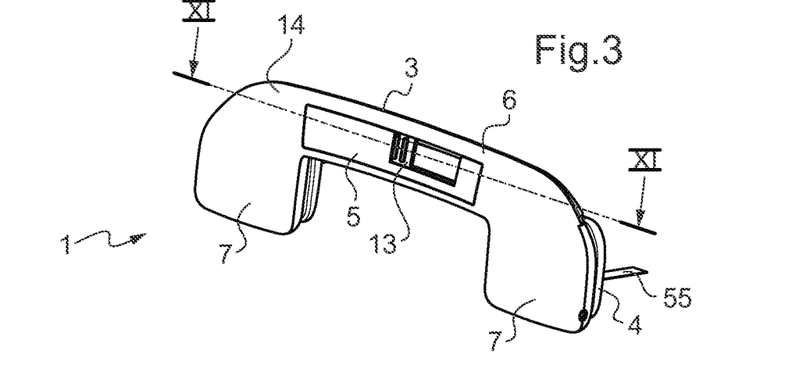
FIG. 3 is a perspective view of the assist grip handle from FIGS. 1 and 2 shown separately and from a different angle in the retracted position as in FIG. 1 in which the assist grip handle is also in a second lighting configuration.

The shutter 13 is configured to assume different positions, namely at least a closed position shown in FIG. 1 and therefore defining the first lighting configuration and an open position shown in FIG. 3, in which the assist grip handle 1 is shown separately. The open position of the shutter 13 shown in FIG. 3 defines a second, more powerful so-called functional lighting configuration, for example for reading.

The handle body 3 will now be described in more detail with reference to FIGS. 1 to 5.

Figures 4, 5, 6:
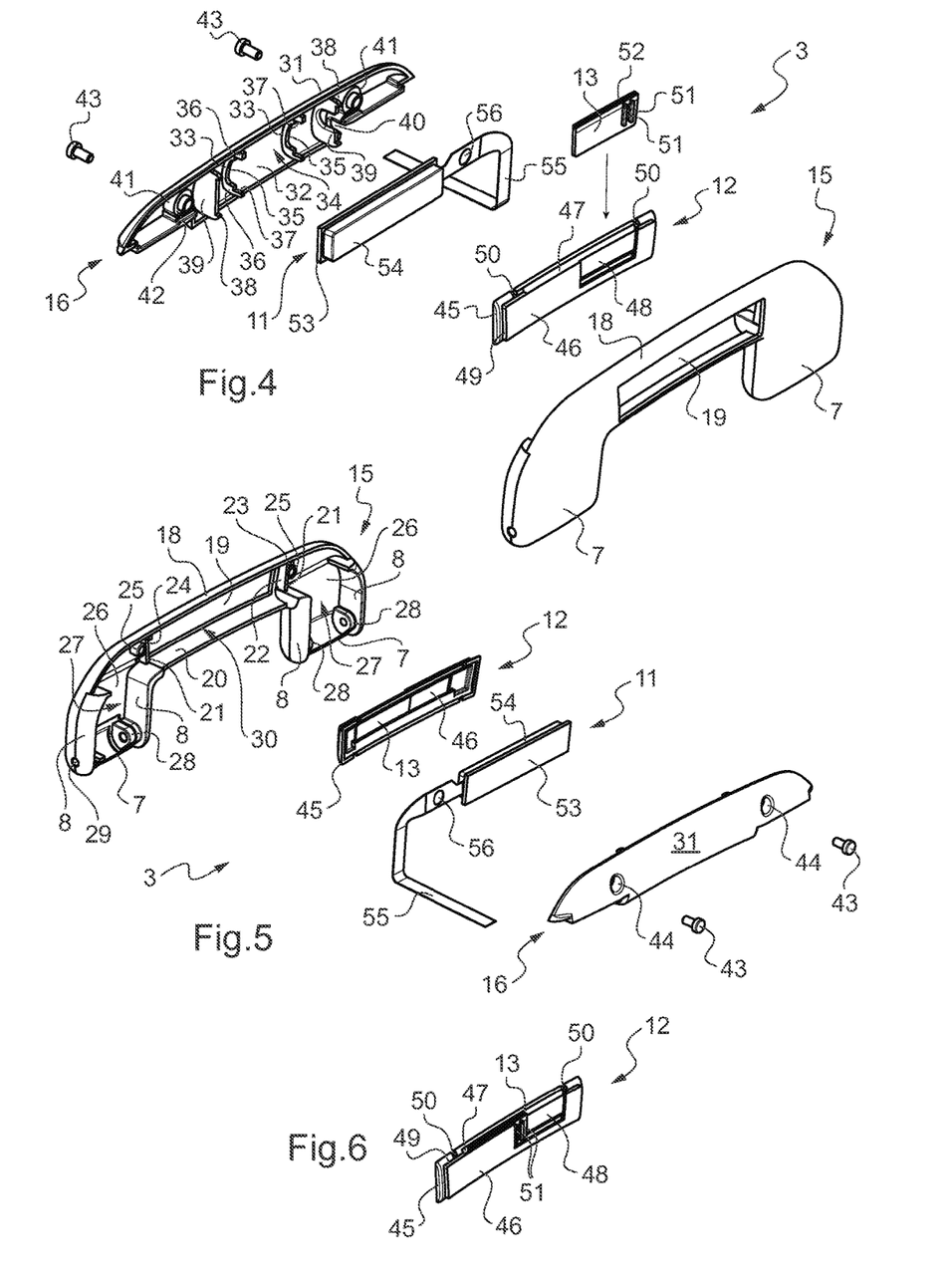
FIG. 4 is an exploded perspective view of a body and a light-emitting device of the assist grip handle from FIGS. 1 to 3, shown separately.
FIG. 5 is a view similar to that of FIG. 4, as seen from a different angle and showing the light-emitting device in only a partially exploded view.
FIG. 6 is a perspective view of a diffusion screen of the light-emitting device shown in FIGS. 4 and 5, shown separately, which screen is here in an open position enabling the assist grip handle to assume its second lighting configuration.

The handle body 3 comprises a front part 15, also referred to as the first part, and a rear part 16, also referred to as the second part, opposite the front part 15.

Figure 11:
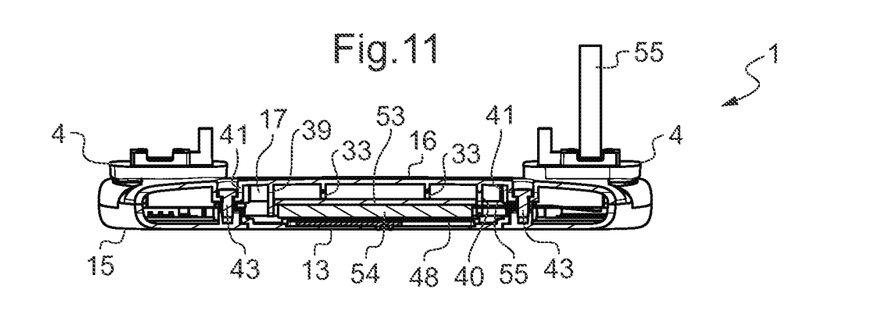
FIG. 11 is a view in section taken along the line XI-XI in FIG. 3.

The front and rear parts 15 and 16 are configured to be fixed together, here by means of fixing screws 43, and delimit a space 17 inside the handle body 3 to receive the light-emitting device 5 (see FIG. 11).

The front part 15 has substantially the same general shape as the assist grip handle 1 and essentially defines the overall shape of the handle body 3.

In fact, the front part 15 comprises a central portion 18 that extends substantially longitudinally and two lateral portions disposed at respective opposite ends of the central portion 18 which form the two end portions 7 of the handle body 3.

The front part 15 includes a diffusion window 19 in the central portion 18.

The front part 15 further includes an inside face 20 and two first walls 21, also referred to as first holding members, projecting from the inside face 20 and disposed on respective opposite sides of the diffusion window 19 so as to define a reception space 30 designed to receive at least partially the diffusion screen 12 of the light-emitting device 5.

Each first wall 21 includes a back portion 22 and a lateral portion 23 attached to the back portion 22 and defining a shoulder 24.

The back portions 22 delimit the reception space 30 in the front part 15.

It will be noted that the diffusion window 19, the reception space 30 and the two first walls 21 are in the central portion 18 of the front part 15.

In this central portion 18 there are also two sleeves 25, here threaded, projecting from the inside face 20 and configured to receive at least partially the fixing screws 43.

The front part 15 further includes, at the level of the inside face 20 and more particularly at the level of each of the end portions 7, a back wall 26 extending between two respective arms 8 and defining with the latter a reception cavity 27 for a respective fastening plate 4.

The front part 15 also includes protuberances 28 that are pierced centrally, in line with the back walls 26 and contiguous with the arms 8.

It will be noted that at the level of one of the end portions 7 the front part includes two such protuberances 28 (on the right in FIG. 5) whereas at the level of the opposite end portion 7 the front part includes only one such protuberance 28 contiguous with the arm 8 that faces an arm 8 of the other end portion 7.

Each of the arms 8 of the end portions 7 at the free ends of the handle body 3 includes a longitudinal hole 29 leading into the respective reception cavity 27.

For its part, the rear part 16 includes a single longitudinal portion 31 including two openings 44 on its outside face for inserting the screws 43.

The rear part 16 comprises an inside face 32 and two second walls 33, also referred to as second holding members, projecting from the inside face 32 and defining a reception space 34 for receiving at least partially the light source 11.

Each wall 33 includes a back portion 35 and two lateral portions 36 on respective opposite sides of the back portion 35 and defining a shoulder 37.

The rear part 16 further includes two ribs 39 projecting from the inside face 32 on respective opposite sides of the two walls 33 and which are therefore between the two ribs 39.

The two ribs 39 therefore delimit the reception space 34 for receiving at least partially the light source 11 and the diffusion screen 12.

Each rib 39 includes two projecting fingers 38 extending away from the inside face 32.

One of the two ribs 39 further includes a notch 40, here between the two fingers 38.

The rear part 16 further includes two sleeves 41, here threaded, leading into the openings 44 and including two shoulders 42 opposite the openings 44, which sleeves 41 are configured to receive the screws 43.

It will be noted that the openings 44 and the sleeves 41 face the sleeves 25 of the front part 15 when the rear and front parts 16 and 15 are fixed together.

The diffusion screen 12 will now be described in more detail, notably with reference to FIGS. 4 to 6.

The diffusion screen 12 is made from a plastics material chosen to allow light to pass through this screen and to diffuse it.

The diffusion screen 12 comprises a substantially rectangular frame 45 and a cover 46 attached along the internal contour of the frame 45 by a thin portion of the plastics material from which the frame 45 and the cover 46 are formed together.

The cover 46 is therefore mounted on the frame 45 and is configured to obdurate its interior opening at least partially.

The shutter 13 of the diffusion screen 12 is movably mounted on the cover 46.

The diffusion screen 12 further comprises a groove 47 formed between the cover 46 and the frame 45 and which is configured for translational guiding of the shutter 13 and a through-aperture 48 formed in the cover 46 and entering at the level of the contour 49 of the cover 46.

It will be noted that the groove 47 enters into this through-aperture 48.

The through-aperture 48 and the groove 47 are configured so that the shutter 13 obturates the through-aperture 48 in the closed position of the shutter 13 and the shutter 13 does not obturate the through-aperture 48 in the open position of the shutter 13.

The frame 45 comprises four notches 50, two of which are on an upper edge and two on a lower edge.

The shutter 13 includes a face for manipulating it from which project two lugs 51.

The shutter 13 further includes a lower edge (not shown) which rests on the cover 46 and a free upper edge 52.

Once the shutter 13 is mounted on the cover 46, the shutter 13 is movable in translation in the groove 47 between various positions, and notably between the open and closed positions of this shutter 13 in which it partially or completely obturates or does not obturate the through-aperture 48 in the cover 46.

The light source 11 comprises a support 53, at least one light emitting element 54 mounted on the support 53 and an electrical connection element 55 fastened to the support 53 and configured to electrically supply the light emitting element 54.

Here the light emitting element 54 is a light-emitting diode or even a plurality of light-emitting diodes and the electrical connection element 55 is a flat cable.

The electrical connection element 55 includes a hole 56 near the support 53.

The fastening plates 4 will now be described in more detail, in particular with reference to FIGS. 2, 9 and 10.

The base 9 of each fastening plate 4 includes a fixing aperture 58 for fixing it to the metalwork 2 and has a through-aperture 59 to allow the electrical connection element 55 of the light source 11 to pass through it.

The fastening plates 4 have slightly different heads 10 and each is designed to be mounted on a corresponding end portion 7.

Figure 9:
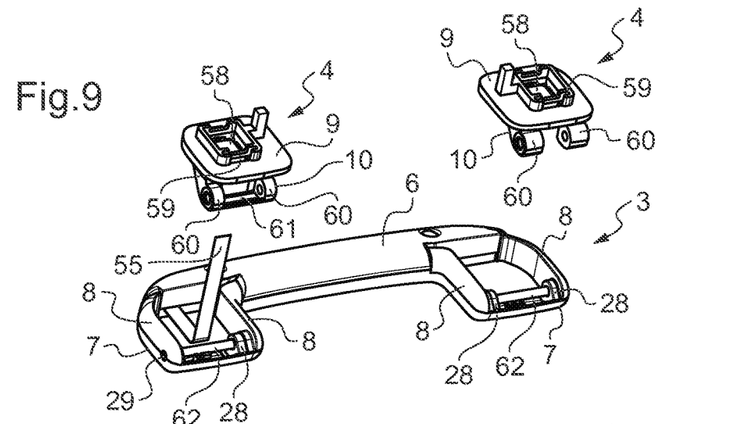
FIG. 9 is a perspective view of the assist grip handle shown in FIGS. 1 to 3, shown separately, and more particularly shows an exploded view of an assembly formed of the body and the light-emitting device as well as two fastening plates.
Figure 10:
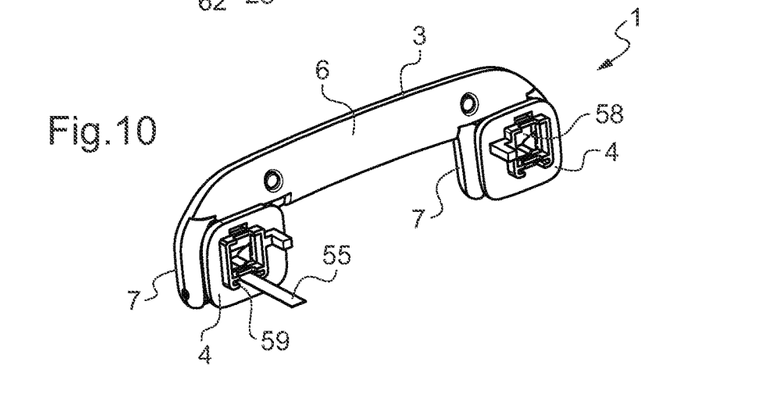
FIG. 10 is a view similar to that of FIG. 3, as seen from a different angle to show in more detail the two fastening plates assembled to the assembly.

One of the fastening plates 4 includes a head 10 that includes two pierced cylindrical portions 60 connected to each other by a connecting portion 61 (on the left in FIG. 9) while the other fastening plate 4 includes a head 10 that includes two pierced cylindrical portions 60 that are not connected to each other (on the right in FIG. 9).

There will now be described, on the one hand, in particular with reference to FIGS. 4, 5, 7 and 8, the assembly of the handle body 3 to the light-emitting device 5 to form an assembly, and, on the other hand, in particular with reference to FIGS. 9 to 11, the assembly of this assembly to the fastening plates 4.

Figure 7:
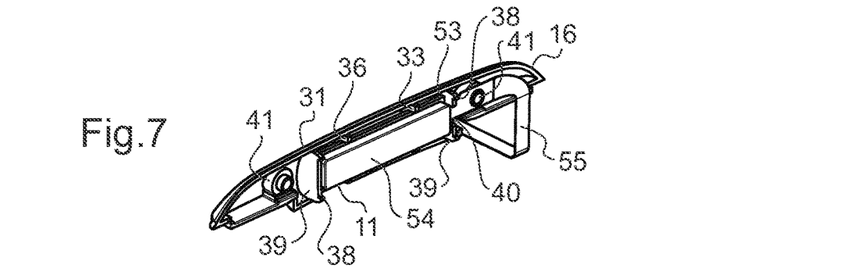
FIGS. 7 and 8 are partial perspective views of the body and the light-emitting device of the assist grip handle shown in FIGS. 5 and 6, respectively in a first assembly state and in a second assembly state.

The light source 11 is mounted at least partially inside the reception space 34 of the rear part 16.

The support 53 of the light source 11 is received between the lateral portions 36 of the walls 33 and, in the depthwise direction, abuts against the shoulders 37.

Respective opposite sides of the support 53 further bear on the sides of the ribs 39.

The light source 11 is disposed so that the electrical connection element 55 passes through the notch 40 in one of the ribs 39.

This electrical connection element 55 bears against the shoulder 42 of the threaded sleeve 41 in the immediate vicinity of the rib 39 including the notch 40.

This threaded sleeve 41 passes at least partially through the hole 56 in the electrical connection element 55.

The light source 11 is therefore against the rear part 16.

Figure 8:
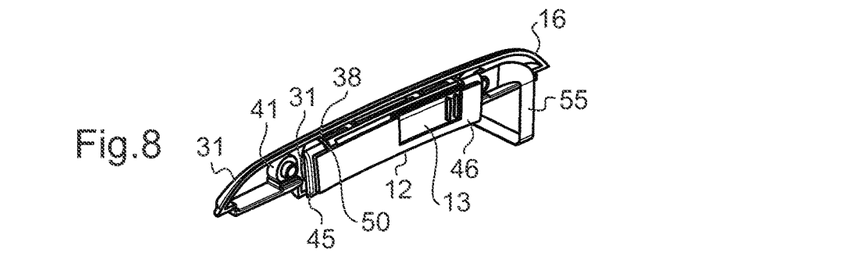

The diffusion screen 12, with its frame 45, cover 46 and movable shutter 13, is then disposed facing and mounted on the light source 11.

The frame 45 of the diffusion screen 12 is disposed on the side of the inside face 32 of the rear part 16 and at least partially overlaps a contour of the light emitting element 54.

The diffusion screen 12 is held in position against the light source 11 by the ribs 39 thanks to the projecting fingers 38 each of which is received in a respective notch 50 in the frame 45 of this diffusion screen 12.

The diffusion screen 12 is therefore positioned and held against the rear part 16, facing the light emitting element 54 of the light source 11.

The front part 15 is then placed against the cover 46 of the diffusion screen 12 so that its diffusion window 19 faces this cover 46.

The front part 15 is therefore positioned so that the cover 46 of the diffusion screen 12 bears against the back portions 22 of the first walls 21 in the front part 15 and the contour 49 of this cover 46 cooperates with and bears against the shoulders 24 defined by the lateral portions 23 of these walls 21.

The diffusion screen 12 is therefore held in position both by the rear part 16 and by the front part 15.

The front part 15 and the rear part 16 therefore sandwich both the light source 11 and the diffusion screen 12 in the internal space 17 of the body 3, the diffusion screen 12 being disposed facing both the light source 11 and the diffusion window 19 of the front part 15.

The front part 15 and the rear part 16 are then fixed together, here by means of the fixing screws 43 that are inserted in the openings 44 in the rear part 16, pass through the threaded sleeves 41 of the latter and are received in the threaded sleeves 25 of the front part 15.

The combination described above including the handle body 3, the diffusion screen 12 and the light source 11 thus forms an assembly.

It will be noted that one portion of the electrical connection element 55 is pinched between the front part 15 and the rear part 16 and another portion enters into the reception cavity 27 of the end portion 7 that includes only one pierced protuberance 28 and extends out of this reception cavity 27 substantially at a right angle to the back wall 26.

The fastening plates 4 are fitted and fixed to the assembly formed in this way by means of connecting pins 62.

The head 10 of the plate 4 that includes a connecting portion 61 connecting the two pierced cylindrical portions 60 is inserted in the reception cavity 27 of the end portion 7 into which the electrical connection element 55 enters, the portion of this connection element 55 that extends from this cavity 27 being passed through the through-aperture 59 in the base 9 of the fixing head 4.

The connecting pin 62 is then inserted through the hole 29 in one of the arms 8 and then pushed through the pierced cylindrical portions 60 until it passes through the pierced protuberance 28 and abuts against the other arm 8 of this end portion 7.

In the same way, the other fastening plate 4, which has no connecting portion, has its head 10 inserted in the reception cavity 27 in the other end portion 7 (opposite the end portion 7 into which the electrical connection element 55 enters).

The pin 62 is then inserted through a hole similar to the hole 29 shown notably in FIG. 9 and is then pushed through one of the pierced protuberances 28 of this end portion 7, the two pierced cylindrical portions 60 of the fastening plate 4 and the other pierced protuberance 28 of this end portion 7 until it abuts against an arm 8 of the latter.

The two fastening plates 4 are therefore mounted on and hingedly fixed to the handle body 3.

It will be noted that the portion of the electrical connection element 55 that emerges from the through-aperture 59 in the fastening plate 4 is configured to be electrically connected to the electrical system of the vehicle.

The supply of electrical power to the light source 11 via the electrical connection element 55 may be controlled directly on the assist grip handle 1 or in its immediate vicinity or even from the dashboard of the vehicle.

The lighting configuration of the assist grip handle 1, namely the functional lighting configuration or the ambient lighting configuration, is selected directly by the passenger in the vehicle in the immediate vicinity of the assist grip handle 1, by actuating the movable shutter 13 of the diffusion screen 12 via the diffusion window 19 of the front part 15, which window 19 provides access to this shutter 13.

For ambient lighting the passenger therefore actuates the movable shutter 13 so that it at least partially or even completely obturates the through-aperture 48 in the cover 46 of the diffusion screen 12 and for functional lighting the passenger therefore actuates the shutter 13 so that it is completely or almost completely behind the cover 46 and the through-aperture 48 is consequently totally or almost totally unobturated.

Figure 12:
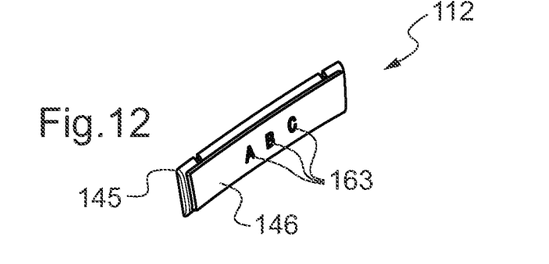
FIGS. 12 and 13 are views similar to that of FIG. 6 showing variant embodiments of the diffusion screen from FIG. 6.
Figure 13:
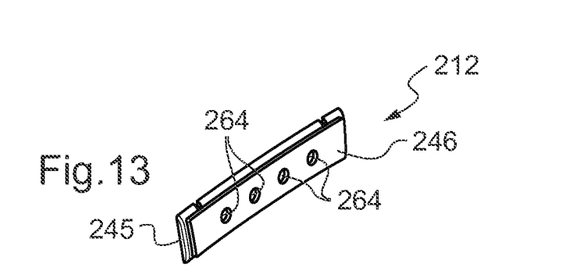

FIGS. 12 and 13 show a variant of the diffusion screen shown in FIG. 6 that has no movable shutter.

In FIG. 12, the diffusion screen 112 includes a frame 145 and a cover 146 including apertures 163 for diffusing light having a predetermined shape that corresponds to a particular symbol.

In FIG. 13, the diffusion screen 212 includes a frame 245 and a cover 246 including circular and cylindrical holes 264 for diffusing light.

In a variant that is not shown, the diffusion screen does not include a movable shutter and includes a frame and a cover which takes the form of a solid wall and includes no aperture or hole. The diffusion screen is made from a plastics material chosen to allow light to pass through this screen and to diffuse it and therefore offers only one lighting configuration, the so-called ambient or diffuse configuration.

Figure 14:
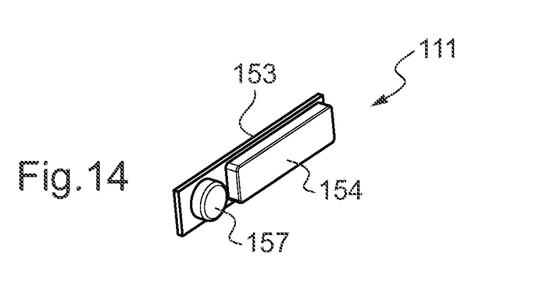
FIG. 14 is a perspective view of a light source of a light-emitting device in accordance with a variant embodiment of the light-emitting device from FIGS. 4 and 5, shown separately.

FIG. 14 shows a light source 111 of a light-emitting device conforming to a variant embodiment of the light-emitting device notably shown in FIGS. 4 and 5.

The light source 111 comprises a support 153, at least one light emitting element 154 mounted on the support 153 and at least one energy storage unit 157, here a battery, mounted on the support 153 and configured to electrically supply the light emitting element 154. This is therefore a so-called autonomous light source 111.

It will be noted that the use of such a light source 111 may necessitate specific access thereto in order to switch it on, for example by means of a switch, for example positioned directly on the handle body.

In variants that are not shown:
- the handle body comprises a front part and a rear part each having the general shape of the body of the assist grip handle;
- the front part comprises a diffusion window that does not pass through it but is rather made from a material selected to be transparent and therefore to allow light to pass it through and to diffuse light;
- the front and rear parts are not fixed together by means of fixing screws but rather by snap-fastener means and complementary snap-fastener means, respectively formed for example by strips or lugs and ribs or apertures that are configured to cooperate with each other, which snap-fastener means and complementary snap-fastener means are on the front and rear parts;
- the shutter of the diffusion screen is hinged to the cover rather than sliding between the cover and the frame;
- the light emitting element takes the form of a striplight or a neon device rather than one or more light-emitting diodes;
- the electrical connection element takes the form of a round cable rather than a flat cable;
- the assist grip handle does not include fastening plates for hinging the handle body and instead includes plates to which the handle body is fixed in a predetermined stable position; and/or
- the assist grip handle includes an integrated light that emits and diffuses light continuously rather than being controlled from the dashboard or directly on it or in its immediate vicinity.

More generally, it is pointed out that the invention is not limited to the examples described and shown.

The invention claimed is:

1. An assist grip handle for a vehicle interior, comprising a handle body provided with an internal space and a light-emitting device disposed in said internal space of said body, characterized in that said light-emitting device is distinct from said body and comprises a light source and a diffusion screen disposed in said internal space of said body, which body comprises a first part and a second part fastened together and configured to sandwich said light source and said diffusion screen, said diffusion screen being disposed facing both said light source and said first part of said body.

2. A handle according to claim 1, wherein said diffusion screen comprises a movable shutter and said handle has a first lighting configuration in which said shutter is in a closed position and a second lighting configuration in which said shutter is in an open position.

3. A handle according to claim 2, wherein said diffusion screen comprises a frame and a cover formed together from at least one plastics material, said shutter being movably mounted on said cover.

4. A handle according to claim 3, wherein said diffusion screen further comprises a groove formed between said cover and said frame and which is configured for translational guiding of said shutter, and a through-aperture formed in said cover and into which enters said groove, said through-aperture and said groove being configured such that, in said closed position of said shutter, said shutter obturates said through-aperture and in said open position of said shutter, said shutter does not obturate said through-aperture.

5. A handle according to claims 3, wherein said first part is provided with a diffusion window formed so as to face said cover of said diffusion screen.

6. A handle according to claim 5, wherein said first part has an inside face provided with at least one first holding member defining a reception space for at least partially receiving said diffusion screen, and said cover comprises a predetermined contour configured to cooperate with said at least one first holding member for holding said diffusion screen.

7. A handle according to claim 6, wherein said first part comprises two first holding members disposed on respective opposite sides of said diffusion window and which are each formed by a first wall projecting from said inside face of said first part, which first wall has a back portion and a lateral portion defining a shoulder.

8. A handle according to claim 1, wherein said second part has an inside face provided with at least one second holding member defining a reception space for receiving said light source at least partially, which light source comprises a support configured to rest on said at least one second holding member for holding said light source.

9. A handle according to claim 8, wherein said second part comprises two second holding members each formed by a second wall projecting from said inside face of said second part, which second wall has a back portion and two lateral portions extending on respective opposite sides of said back portion and each defining a shoulder.

10. A handle according to claim 8, characterized wherein said second part is further provided with two ribs projecting from said inside face of said second part, which ribs are disposed on respective opposite sides of said at least one second holding member and delimit said reception space for receiving said light source.

11. A handle according to claim 10, wherein said diffusion screen comprises four notches each formed so as to receive a finger formed projecting from a said rib.

12. A handle according to claim 1, wherein said diffusion screen comprises a frame and a cover which are formed together from at least one plastics material as well as a plurality of apertures each of predetermined contour formed in said cover and configured to diffuse light.

13. A handle according to claim 1, wherein said light source comprises a support, at least one light emitting element mounted on said support and at least one energy storage unit which is mounted on said support and configured to electrically supply said at least one light emitting element.

14. A handle according to claim 1, wherein said light source comprises a support, at least one light emitting element mounted on said support and an electrical connection element fastened to said support and configured to electrically supply said at least one light emitting element.

15. A handle according to claim 14, wherein said handle body comprises a central portion for gripping and two end portions each provided with two arms which are remote from each other, said handle further comprising two fastening plates each configured to be hingedly mounted on said handle body between two said arms of a respective end portion, at least one of the two said plates comprising an through-aperture configured to allow the passage of said electrical connection element.

* * * * *